(12) United States Patent
Tagliasacchi et al.

(10) Patent No.: US 11,568,601 B2
(45) Date of Patent: Jan. 31, 2023

(54) REAL-TIME HAND MODELING AND TRACKING USING CONVOLUTION MODELS

(71) Applicant: UVic Industry Partnerships Inc., Victoria (CA)

(72) Inventors: Andrea Tagliasacchi, Victoria (CA); Anastasia Tkach, Saint-Sulpice (CH); Mark Pauly, Lausanne (CH)

(73) Assignee: UVic Industry Partnerships Inc., Victoria (CA)

( * ) Notice: Subject to any disclaimer, the term of this patent is extended or adjusted under 35 U.S.C. 154(b) by 0 days.

(21) Appl. No.: 16/325,372

(22) PCT Filed: Aug. 14, 2017

(86) PCT No.: PCT/IB2017/054953
§ 371 (c)(1),
(2) Date: Feb. 13, 2019

(87) PCT Pub. No.: WO2018/033852
PCT Pub. Date: Feb. 22, 2018

(65) Prior Publication Data
US 2019/0272670 A1    Sep. 5, 2019

Related U.S. Application Data

(60) Provisional application No. 62/374,859, filed on Aug. 14, 2016.

(51) Int. Cl.
*G06T 17/20* (2006.01)
*G06T 7/246* (2017.01)
*G06V 40/20* (2022.01)

(52) U.S. Cl.
CPC .............. *G06T 17/20* (2013.01); *G06T 7/251* (2017.01); *G06V 40/28* (2022.01);
(Continued)

(58) Field of Classification Search
CPC combination set(s) only.
See application file for complete search history.

(56) References Cited

U.S. PATENT DOCUMENTS 6,535,215 B1 * 3/2003 DeWitt ................... G06T 13/40
345/473
2005/0265583 A1 * 12/2005 Covell ............... G06K 9/00375
382/103
(Continued)

FOREIGN PATENT DOCUMENTS

WO    WO2014126711 A1    8/2014

OTHER PUBLICATIONS

International Search Report and Written Opinion dated Dec. 15, 2017, from International Patent Application No. PCT/IB2017/054953, 10 pp.
(Continued)

*Primary Examiner* — Andrew G Yang
(74) *Attorney, Agent, or Firm* — Klarquist Sparkman, LLP

(57) ABSTRACT

Technologies are provided herein for modeling and tracking physical objects, such as human hands, within a field of view of a depth sensor. A sphere-mesh model of the physical object can be created and used to track the physical object in real-time. The sphere-mesh model comprises an explicit skeletal mesh and an implicit convolution surface generated based on the skeletal mesh. The skeletal mesh parameterizes the convolution surface and distances between points in data frames received from the depth sensor and the sphere-mesh model can be efficiently determined using the skeletal mesh. The sphere-mesh model can be automatically calibrated by dynamically adjusting positions and associated radii of vertices in the skeletal mesh to fit the convolution surface to a particular physical object.

32 Claims, 13 Drawing Sheets

(52) U.S. Cl.
CPC ............... *G06T 2200/04* (2013.01); *G06T 2207/10016* (2013.01); *G06T 2207/10028* (2013.01); *G06T 2207/30196* (2013.01)

(56) References Cited

U.S. PATENT DOCUMENTS

| | | | | |
|---|---|---|---|---|
| 2009/0135189 | A1* | 5/2009 | Kim | G06T 19/20 345/473 |
| 2010/0045671 | A1* | 2/2010 | Slabaugh | G06T 17/10 345/420 |
| 2010/0182329 | A1* | 7/2010 | Yamaguchi | G06T 13/40 345/474 |
| 2011/0157306 | A1* | 6/2011 | Lin | G06T 19/006 348/43 |
| 2012/0218262 | A1* | 8/2012 | Yomdin | G06T 13/80 345/419 |
| 2014/0232631 | A1* | 8/2014 | Fleischmann | G06F 3/011 345/156 |
| 2015/0062120 | A1* | 3/2015 | Reisner-Kollmann | G06T 19/006 345/419 |
| 2016/0162673 | A1* | 6/2016 | Kutliroff | G06F 21/32 382/115 |
| 2016/0292523 | A1* | 10/2016 | Chuang | G06T 7/536 |
| 2016/0307032 | A1* | 10/2016 | Butler | G06K 9/00375 |
| 2016/0335790 | A1* | 11/2016 | Fleishman | G06V 40/28 |

OTHER PUBLICATIONS

Tagliasacchi et al., "Robust Articulated-ICP for Real-Time Hand Tracking",*Eurographics Symposium on Geometry Processing* 2015, vol. 34, No. 5, pp. 101-114 (2015).

Thiery et al., "Animated Mesh Approximation With Sphere-Meshes", ACM Transactions on Graphics (TOG), vol. 35, Issue 3, Article No. 30, pp. 30: 1-30:13, Jun. 2016 (Jun. 1, 2016) [retrieved on Dec. 6, 2017 (Dec. 6, 2017), retrieved from: <https://dl.acm.org/citation.cfm?id=2898350>].

Theiry et al., "Sphere-Meshes: shape approximation using spherical quadric error metrics", ACM Transactions on Graphics (TOG)—Proceedings of ACM SIGGRAPH Asia 2013, vol. 32, Issue 6, Article No. 178, pp. 178:1-178: 12, Nov. 2013 (Nov. 1, 2013) [retrieved on Dec. 6, 2017 (Dec. 6, 2017), retrieved from: <https://dl.acm.org/citation.cfm?id=2508384>].

Qian et al., "Realtime and Robust Hand Tracking from Depth", 2014 IEEE Conference on Computer Vision and Pattern Recognition (CVPR), pp. 1106-1113, Jun. 23-28, 2014 (Jun. 23, 2014) [retrieved on Dec. 6 2017 (Dec. 6, 2017), retrieved from: <http://ieeeXplore.ieee.org/document/6909541/>]

International Preliminary Report on Patentability, International Application No. PCT/IB2017/054953, 8 pages, dated Feb. 28, 2019.

\* cited by examiner

REAL-TIME HAND MODELING AND TRACKING USING CONVOLUTION MODELS

CROSS REFERENCE TO RELATED APPLICATIONS

This is the U.S. National Stage of International Application No. PCT/IB2017/054953, filed Aug. 14, 2017, which was published in English under PCT Article 21(2), which in turn claims the benefit of U.S. Provisional Application No. 62/374,859, filed Aug. 14, 2016. The provisional application is incorporated herein in its entirety.

FIELD

The technologies described herein relate to the fields of signal processing, computer vision, and object tracking.

BACKGROUND

With the imminent advent of consumer-level virtual and augmented reality technology, the ability to interact with the digital world in more natural ways, such as by using hands instead of keyboards and/or mice, is becoming becomes more important. A number of techniques have been explored to address this problem, from expensive and unwieldy marker-based motion-capture to instrumented gloves as well as imaging systems. Some multi-camera imaging systems can recover the hand pose and hand-objects interactions with high accuracy, but such systems are only capable of operating a low frame rates, such as 10 Hz. Thus, conventional approaches do not provide satisfactory motion tracking with a single RGBD sensor, and are typically limited by low speed, low resolution, or a combination thereof.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The systems, methods, and apparatus disclosed herein generally permit rapid (real-time) estimation of static and dynamic geometry for a human body, part of a human body (such as a hand or other limb), or other object with accuracies suitable for tracking of complex motions.

In one embodiment, a method for modeling and tracking an object comprises generating a sphere-mesh model of a physical object, wherein the sphere-mesh model comprises an explicit skeletal mesh comprising multiple connected vertices and an implicit surface generated based on the skeletal mesh; receiving a data frame from a sensor camera, wherein the data frame comprises depth information for points within a field of view of the sensor camera, wherein the physical object is within the field of view of the sensor camera; and determining a distance between one of the points within the field of view and the implicit surface of the sphere-mesh model by determining a distance between the one of the points and the explicit skeletal mesh of the sphere-mesh model.

In another embodiment, a system comprises a depth sensor configured to generate a depth map of points within a field of view of the depth sensor; and a computing device connected to the depth sensor and configured to: generate a sphere-mesh model of a physical object, wherein the sphere-mesh model comprises a control skeleton comprising multiple connected vertices, and a convolution surface based on the control skeleton; receive the depth map from the depth sensor; and determine a distance between one of the points in the depth map and the convolution surface of the sphere-mesh model by determining a distance between the one of the points and one or more vertices of the control skeleton of the sphere-mesh model.

In another embodiment, one or more computer-readable media store instructions that, when executed by one or more processors, cause the one or more processors to perform operations, the operations comprising: generating a sphere-mesh model of a human hand, wherein the sphere-mesh model comprises a skeletal control mesh comprising multiple connected vertices and a convolution surface generated based on the skeletal control mesh; receiving a data frame from a sensor camera, wherein the data frame comprises depth values for points on the human hand within the field of view of the sensor camera; and determining distances between the points in the data frame and the convolution surface of the sphere-mesh model, wherein determining the distances comprises using the depth values for the points in the data frame to determine distances between the points in the data frame and the skeletal control mesh of the sphere-mesh model.

In response to the determination of a location or one or more distances associated with a human hand, fingers, other body part, or any other object using the disclosed approaches, a processor generated display is updated or presented, or such location or distance information (typically available as digital data) is provided to one or more processor-based applications to serve as a user input. In this way, a tracked object can replicate the functions of a conventional user input device such as a mouse or other conventional pointing device. In other examples, positions of movable objects can be assessed to permit processor-based control of such objects.

As described herein, a variety of other features and advantages can be incorporated into the technologies as desired.

DETAILED DESCRIPTION

Tracking: Discriminative Vs. Generative.

Previous systems for real-time tracking from data points comprising depth information rely on a combination of discriminative approaches and generative approaches. The per-frame re-initialization of discriminative methods can prevent error propagation by offering a continuous recovery from tracking failure. However, as these discriminative models are learned from data, they typically only estimate a coarse pose. Generative models can be used to refine the estimate by aligning a geometric template of a physical object (such as a human hand) to a measured point cloud and to regularize its motion through time.

Figure 1:
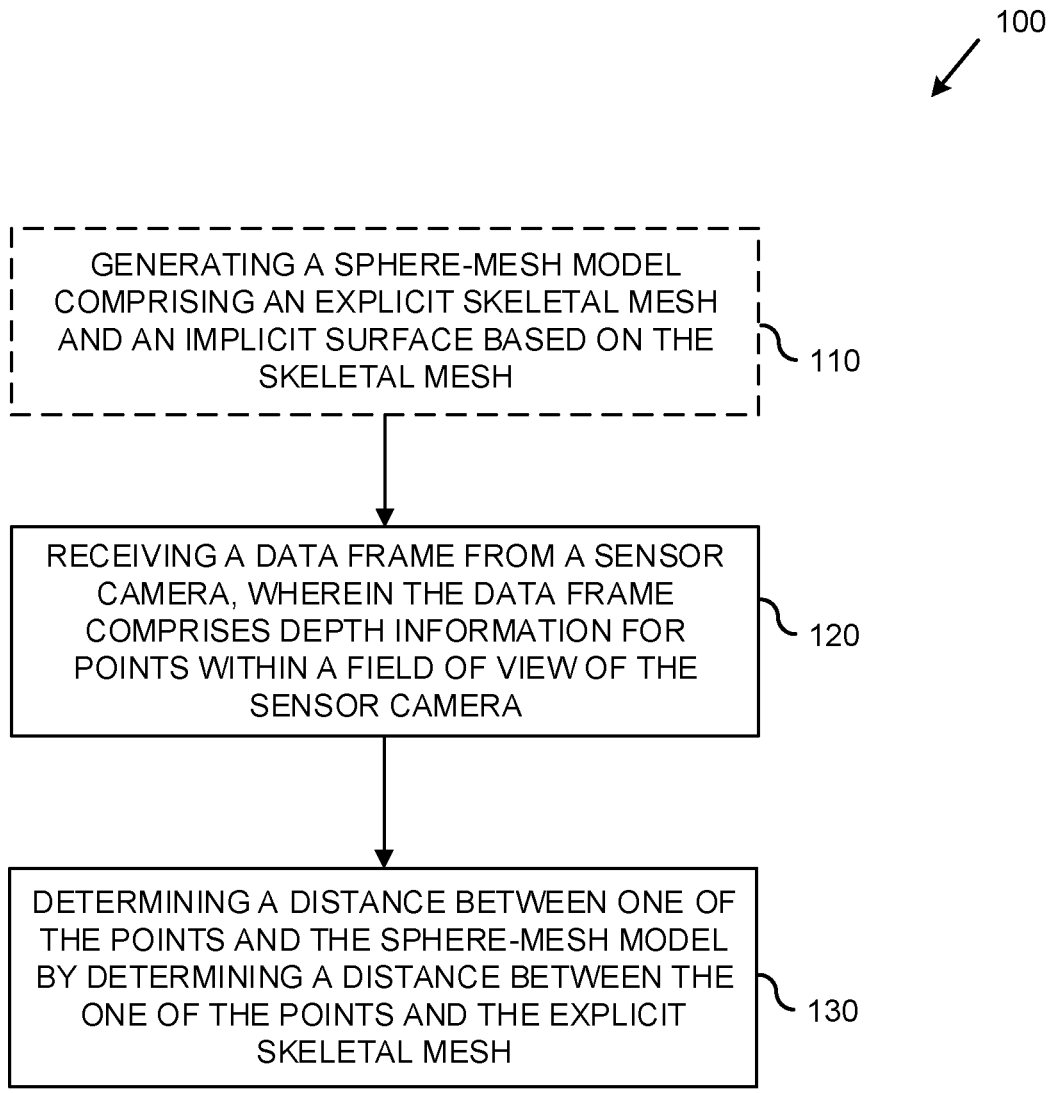
FIG. 1 is a flowchart of an example method for mapping data points received from a depth center to a sphere-mesh model of a physical object.

FIG. 1 is a flowchart of an example method 100 for mapping data points received from a depth center to a sphere-mesh model of a physical object. At 110, optionally a sphere-mesh model of a physical object (such as a human hand) is generated. The sphere-mesh model can comprise an explicit skeletal mesh and an implicit surface that is generated based on the skeletal mesh. The explicit skeletal mesh can comprising multiple connected vertices. In an embodiment where the physical object is a human hand, at least some of the multiple vertices of the explicit skeletal mesh can represent joints of the human hand. In at least some embodiments, the example method 100 can be performed using a predefined sphere-mesh model instead of generating the model at 110.

At 120, a data frame comprising depth information for points within a field of view of a sensor camera is received. If the physical object is within a field of view of the sensor camera, the points in the data frame can represent locations on and around the physical object. At 130, a distance between one of the points within the field of view and the implicit surface of the sphere-mesh model is determined. The distance can be determined, at least in part, by determining a distance between the one of the points and the explicit skeletal mesh of the sphere-mesh model. As described in more detail below, using vertex information of the skeletal mesh, a closest correspondence point on the implicit surface to the one of the points can be determined. This process can be repeated for multiple points in the data frame.

The sensor camera can be any camera or sensor configured to generate depth information for points within a field of view of the camera or sensor. The depth information can be, for example, values indicating distances at which various points in the field of view are located from the camera or sensor. Example sensor cameras include red, green, blue, and depth (RGBD) sensors (e.g., INTEL REALSENSE cameras and MICROSOFT KINECT cameras). A sensor camera can comprise one or more lenses.

Generating the implicit surface of the sphere-mesh model from the explicit skeletal mesh can comprise creating spheres centered on the multiple vertices of the skeletal mesh with radii associated with the multiple vertices. The radii can be stored in association with the vertices in the skeletal mesh and/or stored separately. Determining the distance between the one of the points within the field of view and the implicit surface can comprise using the vertices and the associated radii to determine a point of the implicit surface closest to the one of the points in the data frame.

In at least some embodiments, multiple convolution primitives can be generated, wherein a convolution primitive is based on two or more of the spheres and a surface connecting the two or more spheres (such as a hull surface, e.g. a convex or concave hull). In such an embodiment, for at least one of the convolution primitives, a closest point correspondence on a surface of the convolution primitive to the one of the points can be determined that is within the field of view of the sensor camera.

In a further embodiment, at least one of the convolution primitives is a pill defined by two of the spheres and the surface of the at least one convolution primitive is a plane tangential to the two spheres. In a different or further embodiment, at least one of the convolution primitives is a wedge defined by three of the spheres and the surface of the at least one convolution primitive is a plane tangential to the three spheres.

In at least one embodiment, the example method 100 can further comprise generating a calibrated sphere-mesh model. In such an embodiment, generating the calibrated sphere-mesh model can comprise adjusting positions of the multiple vertices and a shape of the generated implicit surface of a default sphere-mesh model to match joint positions and a shape of the physical object (such as a human hand) in the field of view of the sensor camera. In a different or further embodiment, one or more additional or different sensor cameras can be used for the calibration.

Figure 2:
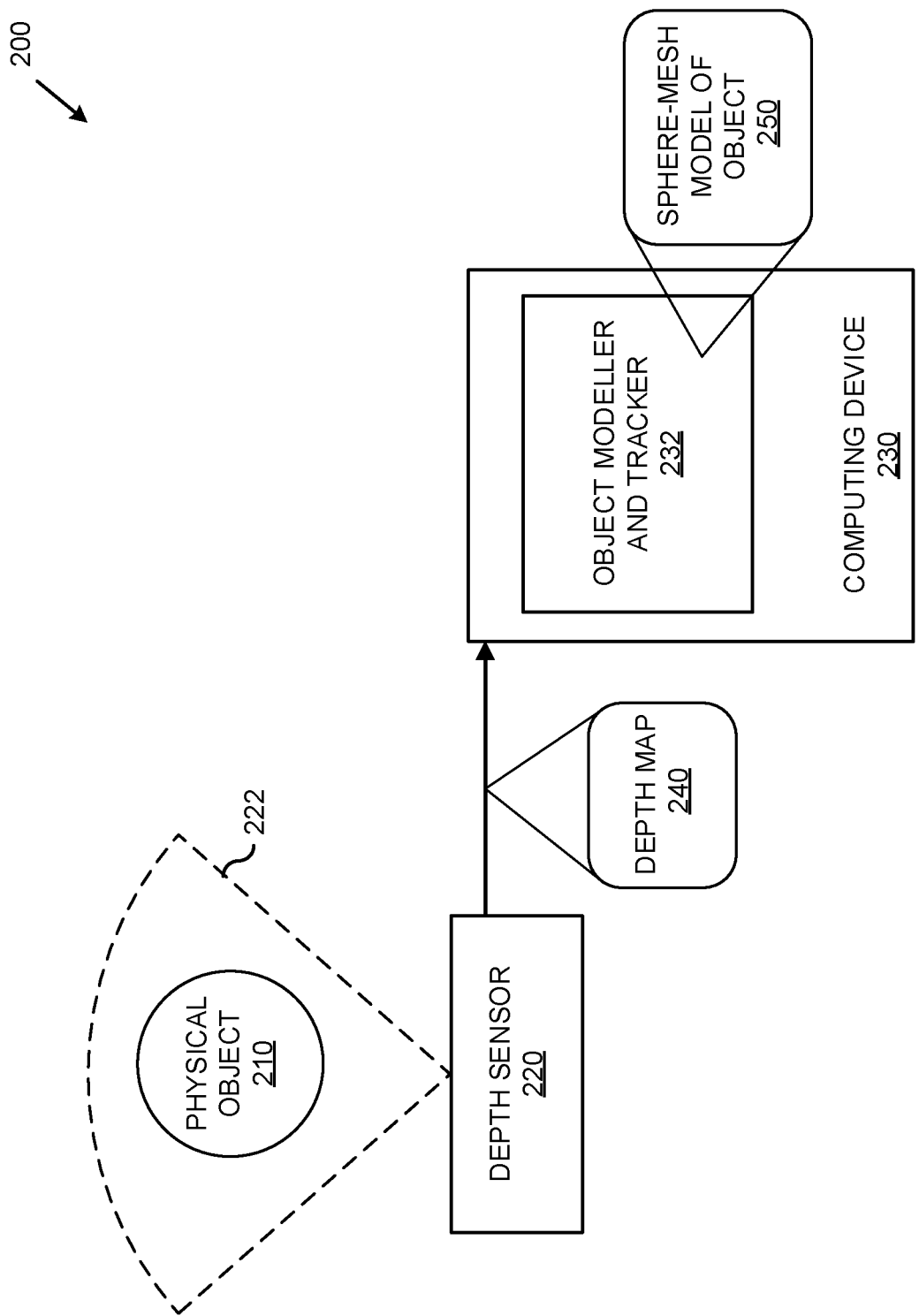
FIG. 2 is a diagram depicting an example system for modeling and tracking a physical object using a depth sensor and one or more sphere-mesh models.

FIG. 2 is a diagram depicting an example system 200 for modeling and tracking a physical object using a depth sensor and one or more sphere-mesh models. The example system 200 can be used to perform any of the example methods described herein.

The example system 200 comprises a depth sensor 220 with a field of view 222. A physical object 210 is depicted within the field of view 222 of the depth sensor 220. The depth sensor can be, for example, a sensor camera as described herein. The depth sensor 220 is configured to generate a depth map 240 of points within the field of view 222 of the depth sensor 220 (including one or more points on and/or near the physical object 210).

A computing device 230 is connected to the depth sensor 220 and configured to receive the depth map 240 from the depth sensor. The computing device 230 comprises an object modeler and tracker 232. The object modeler and tracker 232 can comprise one or more hardware components and/or software executed by one or more processors of the computing device 230.

The object modeler and tracker 232 can be configured to generate a sphere-mesh model 250 of the physical object 210. The sphere-mesh model 250 can comprise a control skeleton comprising multiple connected vertices and a convolution surface generated based on the control skeleton. In at least some embodiments, the vertices of the control skeleton comprise predefined degrees of freedom. The object modeler and tracker 232 can be further configured to determine a distance between one of the points in the depth map 240 and a convolution surface of the sphere-mesh model 250 by determining a distance between the one of the points and one or more of the vertices of the control skeleton of the sphere-mesh model 250.

In addition to controlling user interfaces of traditional applications, virtual reality (VR) and/or augmented reality (AR) applications are also possible. For example, the depth sensor 220 and the computing device 230 can be incorporated into a head-mounted computing device (such as a VR and/or AR headset) worn by a user and used to track interactions of one or more physical objects (such as one or more of the user's hands) with virtual or holographic elements.

Figure 3:
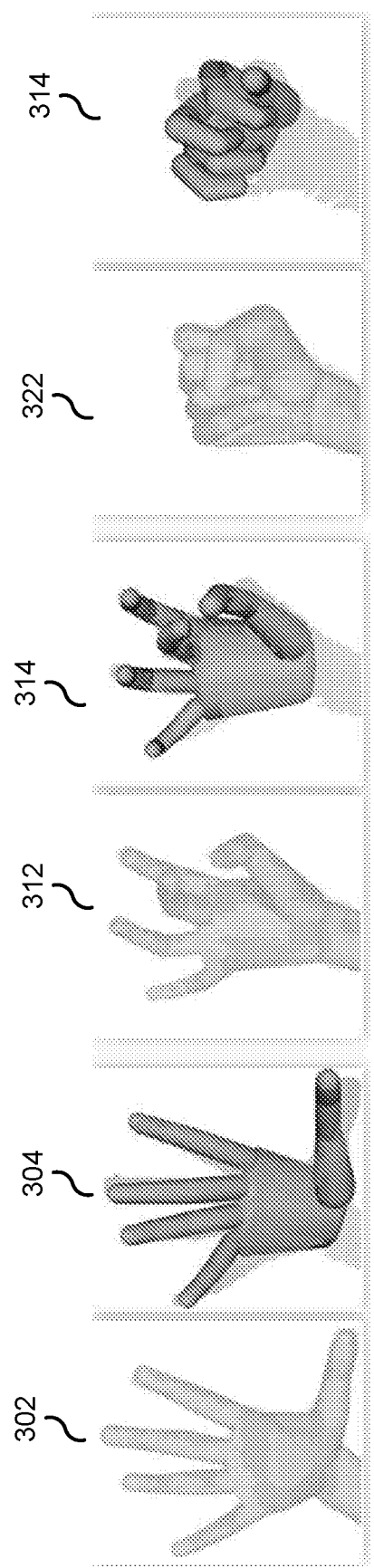
FIG. 3 is a diagram depicting three side-by-side comparisons of example models of hands generated using techniques described herein compared with models generated using previous techniques.

In many cases, the quality of a model template used directly affects the quality of pose refinement. FIG. 3 is a diagram depicting three side-by-side comparisons of example models of hands generated using techniques described herein (302, 312, and 322) compared with models generated using previous techniques (304, 314, and 324). The higher quality of the pose refinement of the models 302, 312, and 322 is readily apparent.

At least some of the tracking models described herein improve a balance between accuracy and performance, as compared to models generated using previous techniques (e.g., 304, 314, and 324). At least some of the models described herein are geometric models that more accurately captures a user's hand geometry, while retaining the ability to answer registration queries in closed form with very high efficiency.

Figure 4:
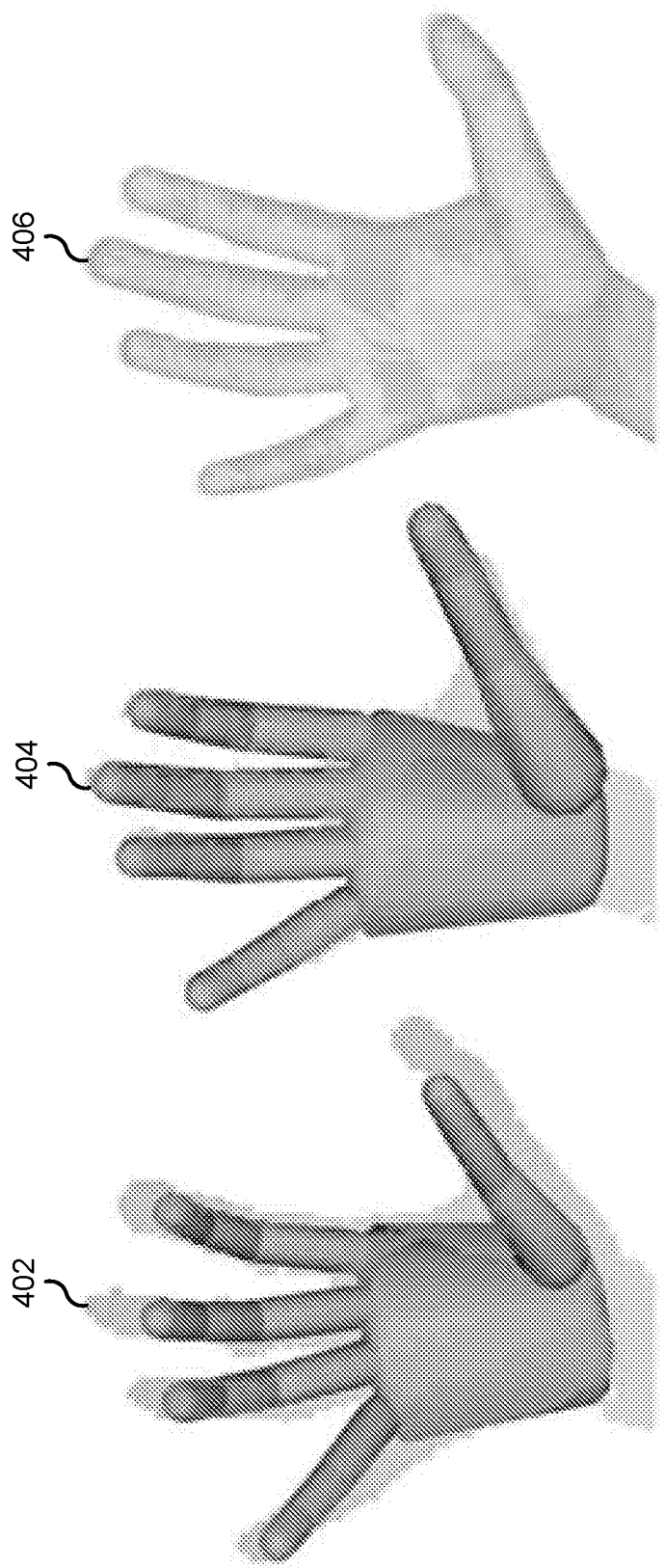
FIG. 4 is a diagram depicting two models of a hand generated using previous techniques and an example model of the hand generated using technologies described herein.

FIG. 4 is a diagram depicting tracking using two models of a hand generated using previous techniques (402 and 404) and tracking using an example model of the hand generated using technologies described herein (406). The 402 tracking illustrates tracking performed with a model without proper coarse scale calibration. The 404 tracking illustrates tracking with a model that has been roughly manually calibrated. Although the manual calibration can help increase fitting fidelity, tuning becomes increasingly difficult as the number of degrees of freedom increase. The 406 tracking illustrates tracking using a model that has been automatically calibrated using calibration techniques described herein.

Implicit and Explicit Templates.

In modern digital production, the de-facto standard is to represent objects by a surface mesh of their boundary (e.g. triangle or quad meshes). Fast rendering and easy direct manipulation make explicit surface representation attractive for many applications. However, unlike implicit models, explicit representations cannot efficiently answer queries such as the distance from a point to the object's boundary, or whether a point lies inside/outside the model. In tracking applications, these queries play a fundamental role, as the optimization attempts to find configurations where the average distance from model to data is minimized. Similarly, a tracker should prevent the model from assuming implausible configurations, for example by preventing self-intersections as measured by inside/outside predicates. For all these reasons, implicit models appear highly suitable for registration applications; indeed, compelling results in joint rigid registration and reconstruction as well as its recent non-rigid variant leverage implicit models. However, in many cases, such techniques assume the frame-rate is high compared to motion velocity, a condition that is in general not satisfied in our setting. To address this challenge, a hybrid model for tracking can be employed that combines the advantages of explicit and implicit representations.

Hybrid Tracking Model.

Figure 5:
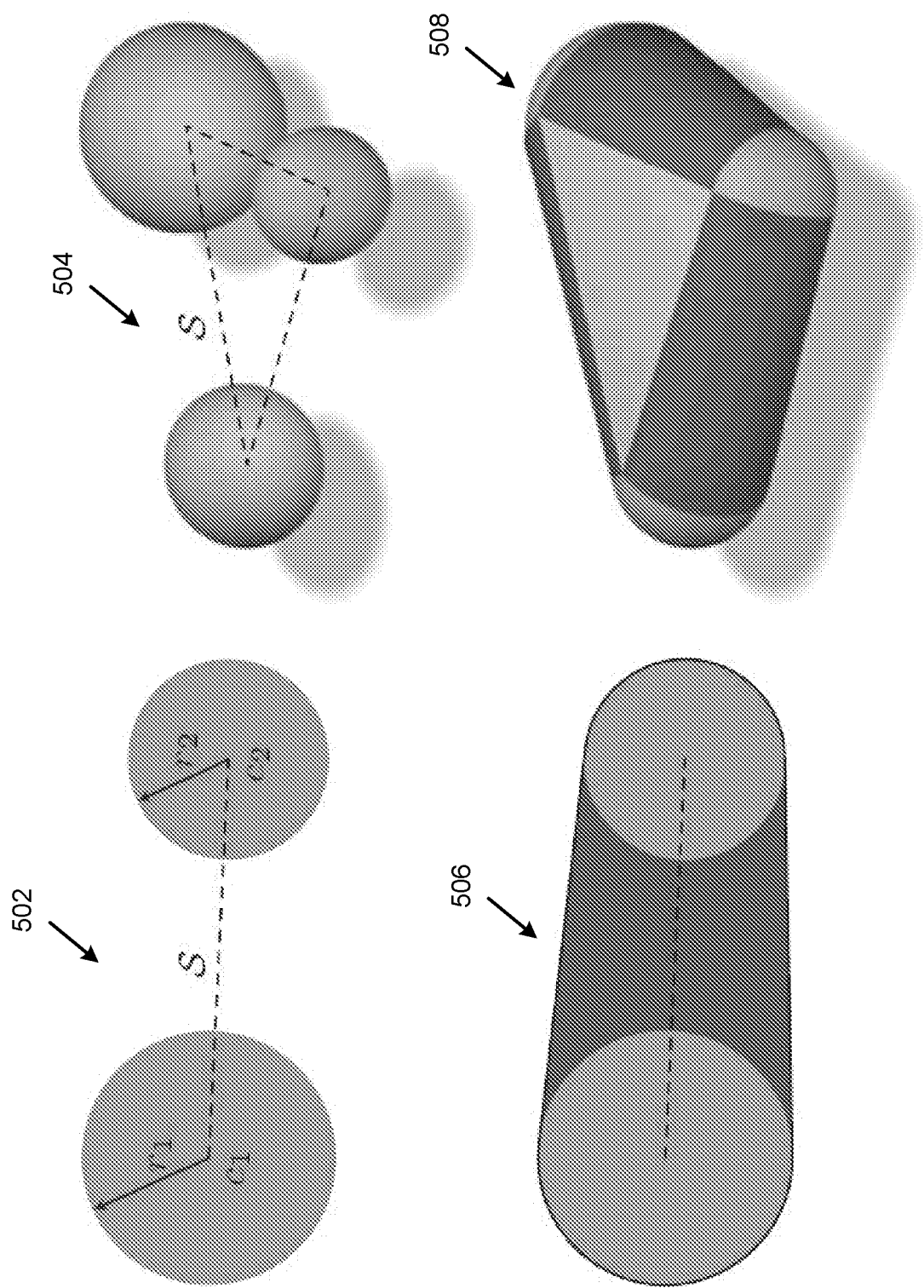
FIG. 5 is a diagram depicting example explicit skeletal mesh and generated convolution surfaces.

A hybrid tracking model, can be a variant of a convolution surface, wherein one or more convolution surfaces are generated from an explicit skeletal mesh. FIG. 5 is a diagram depicting an example skeletal mesh $\mathcal{S}$ and example generated convolution surfaces 502-508. A convolution surface can be defined as the zero iso-level of the scalar function:

$$\phi(x) = \min_{c \in \mathcal{S}} \mathcal{B}_{c,r(c)}(x),\qquad\text{(Equation 1)}$$

where $\mathcal{S}$ is a skeletal control mesh (a segment or a triangle in the simple examples of FIG. 5), and $\mathcal{B}$ is the implicit function of a sphere parameterized by its center c and radius r:

$$\mathcal{B}_{c,r(c)}(x) = \|x-c\|^2 - r(c)^2 \qquad\text{(Equation 2).}$$

The sphere centers c span the skeleton $\mathcal{S}$, while the radii are a function of the position c within an element, linearly interpolated from values $r_* = r(c_*)$ specified on the skeletal mesh vertices $c_*$. This is indeed a hybrid model, as Eq. 1 defines an implicit surface $\mathcal{M} = \{x \in \mathbb{R}^n | \phi(x) = 0\}$, while the underlying skeleton S is an explicit representation (i.e. a simplicial complex).

Figure 6:
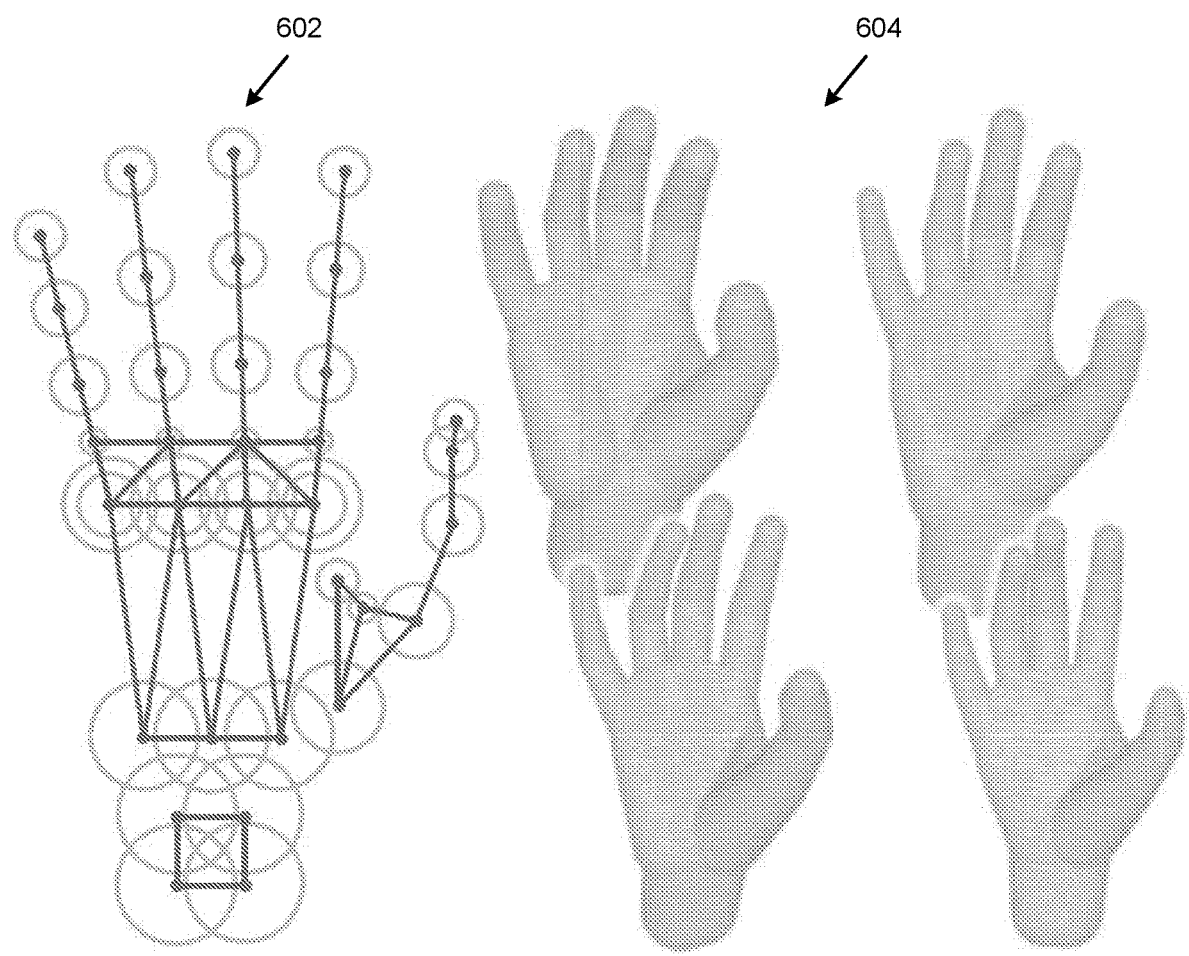
FIG. 6 is a diagram depicting an example explicit skeletal mesh and parameterized convolution surfaces for modelling a human hand.

This construct can be generalized to devise a model suitable to represent a human hand. FIG. 6 is a diagram depicting an example explicit skeletal mesh 602 and parameterized convolution surfaces 604 for modelling a human hand. The skeletal mesh 602 parameterizes the convolution surface 604, providing radii value properties in vertices of the skeletal mesh. In example skeletal mesh 602, articulated components are shown in dark green while flexible components are shown in purple. Calibration can be used to adjust the vertex positions and radii to alter the convolution surface. Distances to $\mathcal{M}$ can conveniently be computed by querying distances to the piecewise linear elements of $\mathcal{S}$; see FIG. 5.

Tracking and Calibration with Sphere-Mesh Models.

This hybrid tracking model has at least two significant advantages. (1) Distance queries to the surface $\mathcal{M}$ can be executed by measuring the distance to the skeletal structure $\mathcal{S}$. The number of elements in $\mathcal{S}$ is often significantly smaller (30in example model 602) than the number of polygons in a typical triangular mesh surface representation. Therefore, distance queries can be performed efficiently using a brute force approach, which leads to a simple algorithm that is trivially parallelizable and executes at a fixed frame-rate. (2) The parameterization of the hand model is compact, as a family of models can be generated by simply adjusting positions and radii of the control skeleton vertices $c_* \in \mathcal{S}$. This allows adapting the model to the hand geometry of a specific user.

Such convolutional models can provide superior hand tracking performance for single-view depth sensors. The tracking model can be optimized to adapt to different human hands with a high level of accuracy. The improved geometric fidelity compared to previous representations leads to quantifiable reductions in registration error and allows accurate tracking even for intricate hand poses and complex motion sequences that previous methods have difficulties with. At the same time, due to a very compact model representation and closed-form correspondences queries, at least some of the generative models described herein retain high computational performance, in some cases leading to sustained tracking at rates of 60 Hz or more.

Hybrid Discriminative and Generative Template Creation.

Pose estimation techniques can be grouped into discriminative and generative techniques, also known respectively as appearance-based and model-based approaches. Generative approaches fit a template through a temporal sequence of images. Given an accurate template of an object being tracked, these methods can resolve highly accurate motion. As the optimization is initialized from the previous frame, tracking loss can occur, although simple geometric reinitialization heuristics can be employed to overcome this issue.

Discriminative methods estimate a pose by extracting features from each image independently by learning from a large dataset of annotated exemplars. While discriminative methods can avoid drift, they lack the accuracy of generative methods, and joint estimates often violate kinematic constraints, like consistent finger lengths and joint limits.

Example Object Tracking

Given a calibrated hand model $\mathcal{M}$, a real-time tracking algorithm can be used that optimizes degrees of freedom θ (e.g., degrees of freedom for global rotation, translation, and articulation) so that a hand model matches sensor input data. (The generation of a calibrated model $\mathcal{M}$ for a user is detailed below). The example tracking optimization can be written in Gauss-Newton/Levenberg-Marquardt form $$\theta_t = \underset{\theta}{\operatorname{argmin}} \sum_{\mathcal{T} \in \mathcal{T}_{track}} w_\mathcal{T} E_\mathcal{T}(\mathcal{D}_t, \theta, \theta_{t-1}),$$ (Equation 3)

where fitting energies are combined with a number of priors to regularize the solution and ensure the estimation of plausible poses. Example energy terms $\mathcal{T}_{Track}$ in the optimization include:

| | |
|---|---|
| d2m | each data point is explained by the model |
| m2d | the model lies in the sensor visual-hull |
| pose | hand poses sample a low-dimensional manifold |
| limits | joint limits must be respected |
| collision | fingers cannot interpenetrate |
| temporal | the hand is moving smoothly in time |

Additional details regarding computational elements that can be adapted to support modeling and tracking using sphere-mesh models described herein are discussed in Tagliasacchi, et al., Robust Articulated-ICP for Real-Time Hand Tracking (2015), a copy of which is attached.

The similarity of two geometric models can be measured by the symmetric Hausdorff distance $d_{X \leftrightarrow Y}$ $$d_{X \to Y} = \max_{x \in X} \left[ \min_{y \in Y} d(x, y) \right]$$

$$d_{Y \to X} = \max_{y \in Y} \left[ \min_{x \in X} d(x, y) \right]$$

$$d_{X \leftrightarrow Y} = \max \{ d_{X \to Y}, d_{Y \to X} \}$$

The terms $E_{d2m}$ and $E_{m2d}$ can be interpreted as approximations to the asymmetric Hausdorff distances $d_{X \to Y}$ and $d_{Y \to X}$, where the difficult to differentiate max operators are replaced by arithmetic means, and a robust $l_1$ distance is used for d(x, y).

Data→Model.

The first asymmetric distance minimizes the average closest point projection of each point p in the current data frame $\mathcal{D}$:

$$E_{d2m} = |\mathcal{D}|^{-1} \sum_{p \in \mathcal{D}} \left\| p - \Pi_{\mathcal{M}(\theta)}(p) \right\|_2^1.$$ (Equation 4)

Adapting this energy, as well as its derivatives, to the sphere-mesh models requires the specification of a projection operator $\Pi_\mathcal{M}$ that is described in more detail below.

Model→Data.

The second asymmetric distance considers how a monocular acquisition system may not have a complete view of the model. While a 3D location is unknown, the model can be penalized from lying outside the sensor's image-space visual hull:

$$E_{m2d} = |\mathcal{M}(\Theta)|^{-1} \sum_{x \in \mathcal{M}(\Theta)} \left\| x - \Pi_\mathcal{D}(x) \right\|_2^1.$$ (Equation 5)

In the equation above, the set of pixels $x \in \mathcal{M}(\Theta)$ can be produced by a rasterization process (described in more detail below) that renders the model with the same implicit and explicit parameters of the sensor camera.

Correspondences.

An example correspondence search can leverage the structure of Eq. 1, by decomposing the surface into several elementary convolution elements (or convolution primitives) $\varepsilon^e$, where e indexes elements of the model template.

Figure 7:
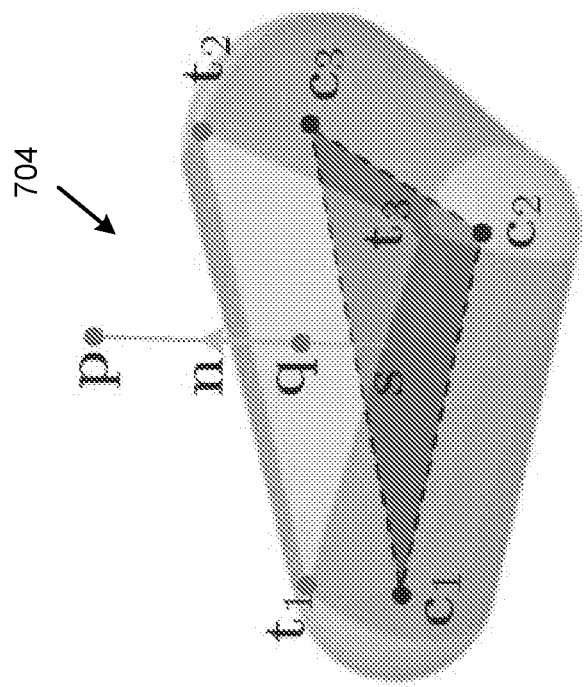
FIG. 7 is a diagram depicting closest point correspondences on example convolution primitives.
Figure 7:
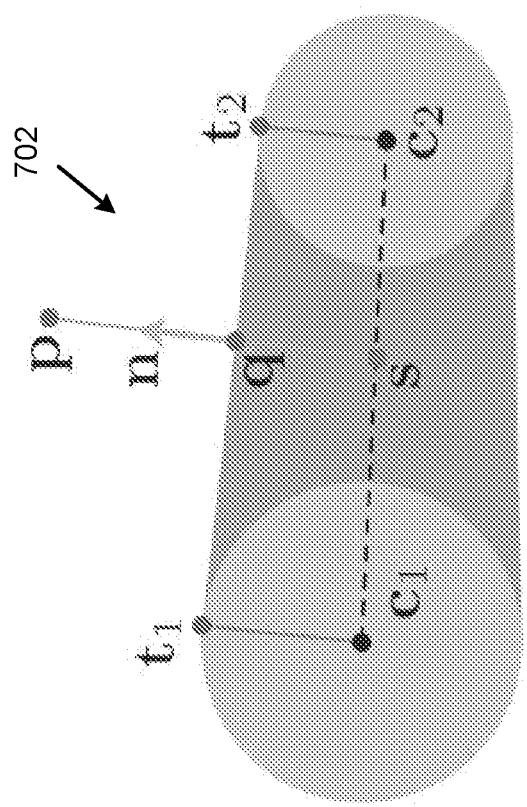

FIG. 7 is a diagram depicting closest point correspondences on example convolution primitives. The computation of closest point correspondences on an example pill convolution primitive 702 and an example wedge convolution primitive 704 can be performed by tracing a ray along a normal of the circles' (702) or spheres' (704) tangent line (702) or tangent surface or plane (704).

Convolution elements can be classified into pill and wedge implicit primitives, with an associated implicit functions $\phi_e$. Given a point p in space, the implicit function of the whole surface can be written by evaluating the expression:

$$\phi_\mathcal{M}(p) = \underset{e=1...E}{\operatorname{argmin}} \phi_e(p).$$ (Equation 6)

Given a query point p, the closest-points $q_e = \Gamma_{\varepsilon^e}(p)$ to each element can be independently. Within this set, the closest-point projection to the full model $q = \Pi_\mathcal{M}(p)$ is the one with the smallest associated implicit function value $\phi_e(p)$.

Pill Correspondences.

In any of the examples described herein, a correspondence of a pill convolution element can be represented by $q = \Gamma_{pill}(p)$. A pill can be defined by two spheres $\mathcal{B}_1(c_1, r_1)$ and $\mathcal{B}_2(c_2, r_2)$. By construction, the closest point correspondence lies on a plane passing through the triplet $\{c_1, c_2, p\}$, thus allowing a solution in 2D; see 702. An intersection point s of the ray $r(t) = p + tn$ with the segment $\overline{c_1 c_2}$ is computed and its location is parametrizes in barycentric coordinates as $s = \alpha c_1 + (1-\alpha) c_2$. If $\alpha \in [0,1]$, a closest point correspondence is given by $q = \Pi_\mathcal{L}(p)$, that is, the intersection of $\overline{c_1 c_2}$ and r(t). If $\alpha < 0$ or $\alpha > 1$, then the closest point will be $q = \Pi_{\mathcal{B}_1}(p)$ or $q = \Pi_{\mathcal{B}_2}(p)$, respectively.

Wedge Correspondences.

In any of the examples described herein, a correspondence of a wedge convolution element can be represented $q=\lceil_{wedge}(p)$. A wedge is defined by three spheres $\mathcal{B}_i=\{c_i, r_i\}$. 704 illustrates how a wedge element can be decomposed in three parts: spherical, conical, and planar elements, associated with vertices, edges, and faces of the triangular convolution skeleton. For the planar element $\mathcal{P}(t_0, n)$ with normal n and tangent $t_0$ to $\mathcal{B}_0$, the skewed projection s can be computed by finding the intersection of the $r(t)=p+tn$ with the triangle $\mathcal{T}$ formed by $c_1, c_2, c_3$. According to the position of s, there are two possible solutions: If s lies inside the triangle $\mathcal{T}$, then the footpoint is $q=\Pi_{\mathcal{P}}(p)$. Otherwise, the barycentric coordinates of s in $\mathcal{T}$ are used to identify a closest pill convolution element and compute $q=\Pi_{pill}(p)$ Monocular Correspondences.

In monocular (i.e., single sensor) acquisition, an oracle registration algorithm aligns the portion of the model that is visible from the sensor viewpoint to the available data. Hence, when computing closest-point correspondences, only a portion of the model currently visible by the camera should be considered. Given a camera direction v, it can be determined whether a retrieved footpoint q is back-facing (i.e., not facing the camera) by testing the sign of $v \cdot \mathcal{N}_{\mathcal{M}}(q)$, where the second term is the object's normal at q.

Figure 8:
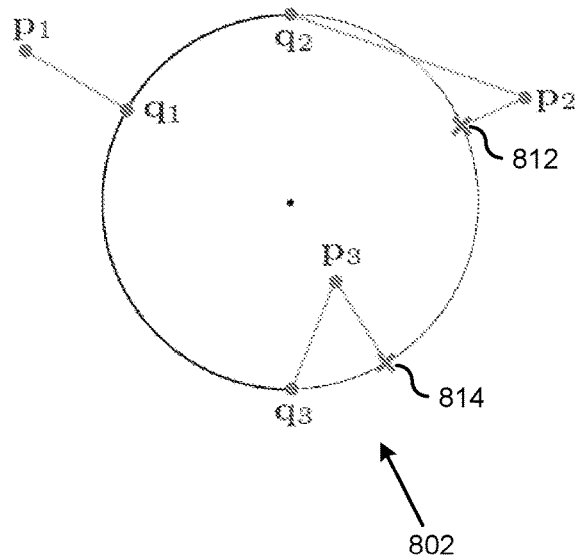
FIG. 8 is a diagram depicting closest point correspondences on example convolution surfaces, disregarding correspondences whose normals point away from a direction of a camera.
Figure 8:
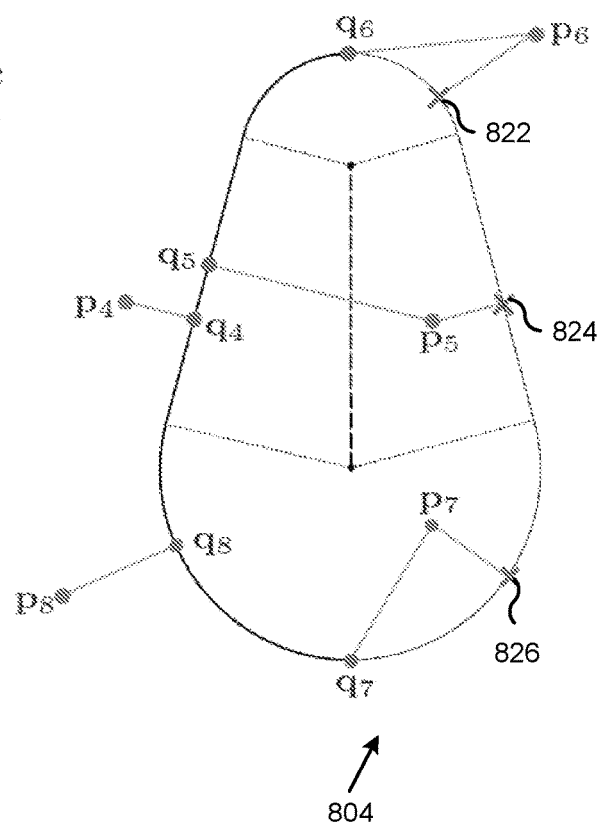

FIG. 8 is a diagram depicting closest point correspondences on example convolution surfaces 802 and 804, disregarding correspondences whose normals point away from a direction of a camera. Example back-facing footpoints 812, 814, 822, 824, and 826 are depicted. Whenever a footpoint is determined to be back-facing, additional candidates for closest point can be checked. Such additional candidates can include: (1) the closest-point on the silhouette of the model (e.g., $p_{2,3,6,7}$), and (2) the front facing planar portions of convolution elements (e.g., $p_5$). These additional correspondences for the query point are computed, and the one closest to p is selected as a front-facing footpoint q (e.g., $(q_{2,3,5,6,7})$.

Silhouette Computation.

The object-space silhouette $\partial\mathcal{M}$ is a (3D) curve separating front-facing from back-facing portions of a shape. To simplify the silhouette computation, the perspective camera of the sensor can be approximated with an orthographic one.

Figure 9:
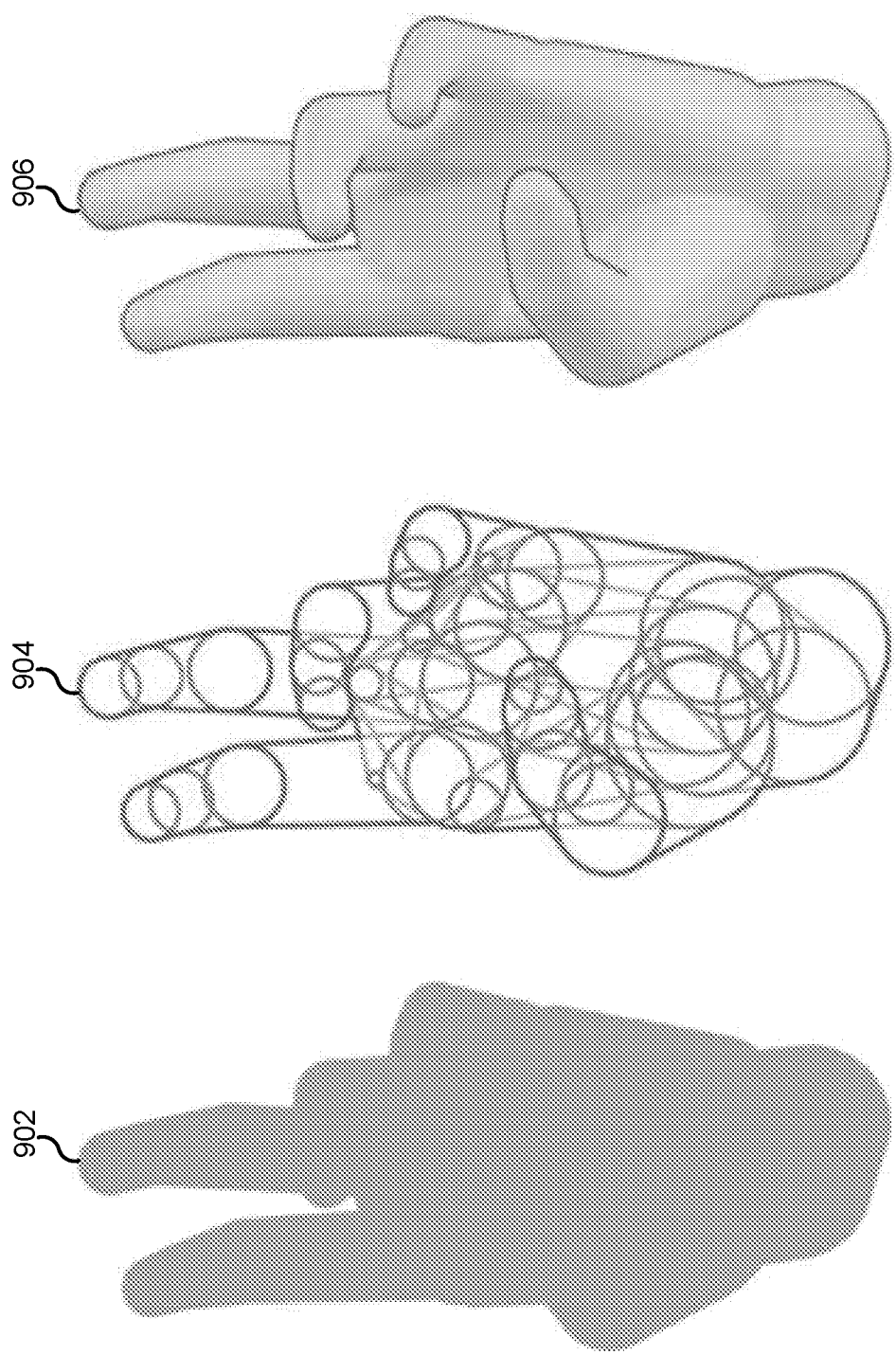
FIG. 9 is a diagram depicting three stages in a generation of an example object-space silhouette of an example sphere-mesh model of a human hand.

FIG. 9 is a diagram depicting three stages in a generation of an example object-space silhouette of an example sphere-mesh model of a human hand using such an orthographic approximation. All convolution elements can then be offset on the 2D camera plane, and a cross-section with this plane can be performed. Spheres are replaced with circles and planes/cylinders with segments; see 902. An arrangement can then be computed, splitting curves whenever intersection or tangency occurs to generate a graph; see 904. This graph can be traversed, starting from a point that is guaranteed to be on the outline (e.g. a point on the bounding box). The traversal selects the next element as the one whose tangent forms the smallest counter-clockwise angle thus identifying the silhouette. Once the 2D silhouette has been computed, it can be re-projected to 3D; see 906.

Note the process described above would compute the image-space silhouette of the sphere-mesh model. In the case of a model of a human hand, the process can be applied to palm and fingers separately, and merged in a subsequent second phase. Such a merge process can check whether vertices $v \in \partial\mathcal{M}$ are contained within the model, and discards those vertices where $\phi_{\mathcal{M}}(v)<0$.

Rendering.

Rendering the sphere-mesh model in real time can be employed for visual verification of tracking performance. The real-time tracking techniques described above can be used to perform a 2D registration in the image plane that requires the computation of an (image-space) silhouette. However, alternatives for rendering a sphere-mesh model also exist. One alternative is to explicitly extract the surface of individual convolution elements by computing the convex hull of pairs or triplets of spheres. While this process may be suitable in applications where the model is fixed, it may not be suitable appropriate in a scenario where the model is calibrated to a specific physical object (such as a particular user's hand).

Another alternative is to ray-trace the sphere-mesh model. Such a ray-trace can be performed, in at least some cases, on a Graphical Processing Unit (GPU) of a computing device. For example, a unit fullscreen quad can be rendered and, in a fragment shader, camera implicits can be used to compute a camera ray r(x) associated with each pixel x. Each ray is intersected with each convolution element of the model in closed form, and only the closest intersection point is retained. Intersection tests can be performed with the planar, conical, and/or spherical primitives that compose convolution elements.

Example Model Calibration

Automatic calibration can be performed to adapt a default model (a.k.a., a template model) to a specific physical object (such as a particular user's hand) from a set of N 3D measurements $\{\mathcal{D}_1 \ldots \mathcal{D}_N\}$ of the physical object in different poses. Multiple measurements are necessary in many cases, as it is not possible to understand the kinematic behavior of many complex objects by analyzing static geometry. In such cases, a redundancy of information improves fitting precision. In monocular acquisition this redundancy is of greater importance, as single-view data is normally incomplete to a large degree. The datasets $\{\mathcal{D}_1 \ldots \mathcal{D}_N\}$ can be acquired via multi-view stereo sensors and/or a single sensor. The calibration techniques described herein can be employed for both acquisition modalities, as well as others.

Kinematics.

Figure 10:
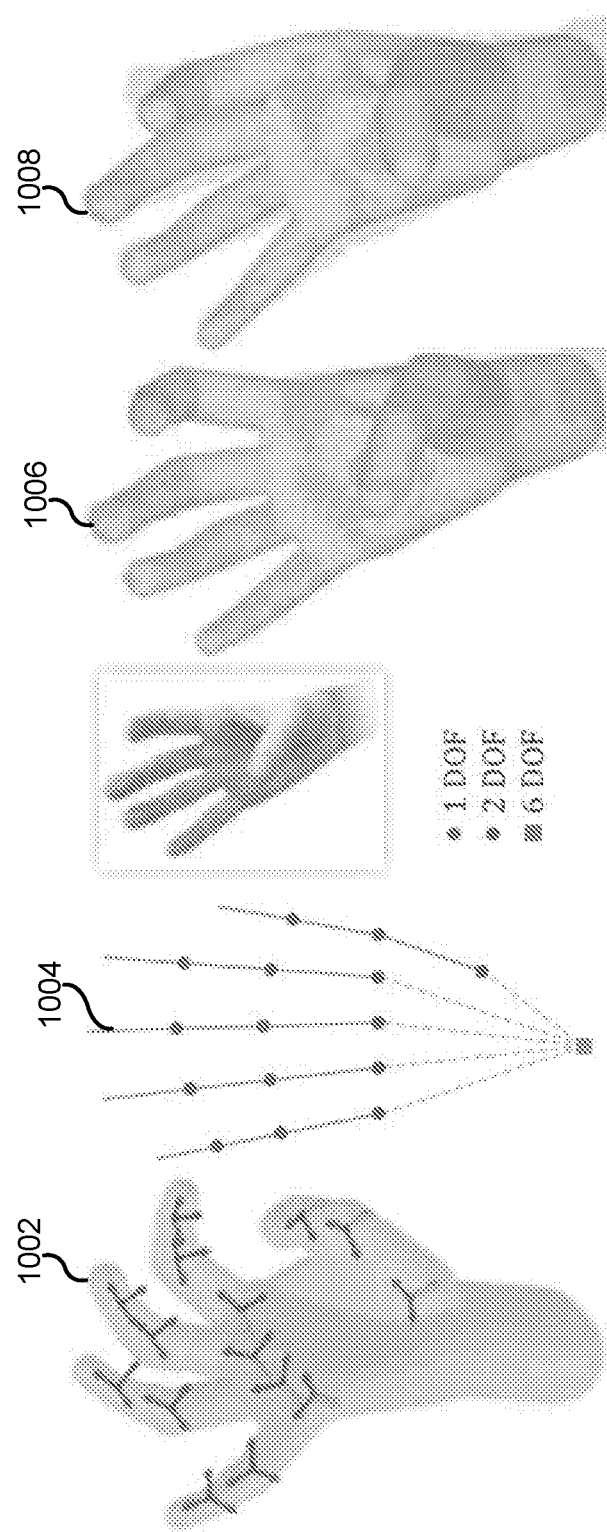
FIG. 10 is a visualization of a posed human hand and its kinematic transformation frames, a kinematic chain and degrees of freedom for posing an example sphere-mesh model of a human hand, and the result of tracking with optimal and non-optimal kinematic transformation frames.

A rest-pose geometry of a sphere-mesh model can be fully specified by two matrices specifying the set of sphere positions C and radii r. The geometry is then posed through the application of kinematic chain transformations. FIG. 10 depicts a posed kinematic frames $T_*$ 1002, a kinematic chain and degrees of freedom for posing an example sphere-mesh model of a human hand 1004, and optimal (1006) and non-optimal (1008) kinematic transformation frames. Given a point $\bar{p}$ on the model $\mathcal{M}$ at rest pose, its 3D position after posing can be computed by evaluating the expression:

$$p=[\Pi_{k \in K(i)} T_k T_k T_k^{-1}]\bar{p} \qquad \text{(Equation 7)},$$

where T are the pose transformations parameterized by θ and Π left multiplies matrices by recursively traversing the kinematic chain K(i) of element i towards the root. Each node k of the kinematic chain is associated with an orthogonal frame $T_k$ according to which local transformations are specified. In some embodiments, the frames $T_*$ 1002 can be manually set by a 3D modeling artist and kept fixed across multiple instances. However, in some cases incorrectly specified kinematic frames can be highly detrimental to tracking quality. For example, note the differences in tracking quality between the optimal kinematic transformation frame 1006 and the non-optimal kinematic transformation frame 1008. Thus in at least some cases, tracking quality can be improved by directly optimizing the kinematic structure from acquired data.

Example Formulation.

Let $\theta_n$ be the pose parameters optimally aligning the rest-pose template to the data frame $\mathcal{D}_n$, and $\delta$ be the posture parameters representing the transformations $T_*$ via Euler angles. For notational brevity, $\Theta_n = [\theta_n, \delta, C, r]$ is also defined. The calibration optimization can then be written as:

$$\delta, C, r = \underset{\{\Theta_n\}}{\operatorname{argmin}} \sum_{n=1}^{N} \sum_{\mathcal{T} \in \mathcal{T}_{calib}} w_{\mathcal{T}} E_{\mathcal{T}}(\mathcal{D}_n, \Theta_n)$$

(Equation 8).

A set of energies $\mathcal{T}_{calib}$ can be employed to account for different requirements. Example requirements can include a good fit of the model to the data and a non-degenerate convolution template that has been piecewise-rigidly posed. The following example calibration energies $\mathcal{T}_{calib}$ encode these example requirements:

d2m data to model Hausdorff distance (approx.)
m2d model to data Hausdorff distance (approx.)
rigid convolution elements are posed rigidly
valid convolution elements should not degenerate To make this calibration more approachable numerically, Eq. 8 can be rewritten as an alternating optimization problem:

$$C, r, \{C_n\} = \underset{\{C_n\},r}{\operatorname{argmin}} \sum_{n=1}^{N} \sum_{\mathcal{T} \in \mathcal{T}_{calib}} w_{\mathcal{T}} E_{\mathcal{T}}(\mathcal{D}_n, C_n, r) \quad \text{(Equation 9)}$$

$$\delta, \{C_n\} = \underset{\{\theta_n\},\delta}{\operatorname{argmin}} \sum_{n=1}^{N} \sum_{\mathcal{T} \in \mathcal{T}_{calib}} w_{\mathcal{T}} E_{\mathcal{T}}(C_n, \Theta_n). \quad \text{(Equation 10)}$$

The first step adjusts radii and sphere centers of the sphere-mesh model, by allowing the sphere-mesh model to fit to the data without any kinematic constraint beyond rigidity, and returning as a side product a set of per-frame posed centers $\{C_n\}$. The second step takes the set $\{C_n\}$ and projects it onto the manifold of kinematically plausible template deformations. This results in the optimization of the rotational components of rest-pose transformations $\overline{T}$, as their translational components are simply derived from C.

Optimization.

The example energies described above are non-linear and non-convex, but can be optimized offline. The pre-calibrated model can then be used for real-time tracking. In a particular embodiment the lsqnonlin Matlab routine can be used, which requires the gradients of the energies as well as an initialization point. The initialization of C is performed automatically by anisotropically scaling the vertices of a generic template to roughly fit the rest pose. The initial transformation frame rotations $\delta$ are retrieved from the default model, while $\{\theta_n\}$ are obtained by either aligning the scaled template to depth images, or by executing inverse kinematics on a few manually selected keypoints (multiview stereo).

Energies.

The example fitting energies are analogous to the ones described above for use in tracking. They approximate the symmetric Hausdorff distance, but they are evaluated on a collection rather than a single data frame:

$$E_{d2m} = |\mathcal{D}_n|^{-1} \sum_{p \in \mathcal{D}_n} \|p - \Pi_{\mathcal{M}(\Theta)}(p)\|_2^1 \quad \text{(Equation 11)}$$

$$E_{m2d} = |\mathcal{M}(\Theta)|^{-1} \sum_{x \in \mathcal{M}(\Theta)} \|x - \Pi_{\mathcal{D}_n}(x)\|_2^1. \quad \text{(Equation 12)}$$

Note that the projection operator $\Pi_{\mathcal{D}_n}$ changes according to the type of input data. If a multi-view acquisition system is used to acquire a complete point cloud, then the projection operator fetches the closest point to p in the point cloud of frame $\mathcal{D}_n$. If $\mathcal{D}_n$ is acquired through monocular acquisition, then $\Pi_{\mathcal{D}_n}$ computes the 2D projection to the image-space silhouette of the model.

Rigidity.

It can be important in some embodiments to estimate a template that jointly fits the set of data frames $\{\mathcal{D}_n\}$. In such embodiments, each posed model can be a piecewise-rigid articulation of a rest pose. This can be achieved by constraining each segment e in the posed centers $C_n$ to have the same length as the corresponding segment e in its rest pose configuration:

$$E_{rigid} = \sum_{e \in C_n} (\|e\| - \|\overline{e}\|)^2. \quad \text{(Equation 13)}$$

Note that only a subset of the edges of a control skeleton are required to satisfy the rigidity condition.

Validity.

The calibration optimization should avoid producing degenerate configurations. For example, a pill degenerates into a sphere when one of its spheres is fully contained within the volume of the other. Analogously, a wedge can degenerate into a pill, or even a sphere in a similar manner. To avoid such degeneration, validity can be monitored by an indicator function $\chi(\mathcal{B}_i)$ that evaluates to one, if $\mathcal{B}_i$ is degenerate, and zero otherwise. This leads to the following penalty function:

$$E_{valid} = \sum_{c_k \in C_k} \chi(c_k) \|c_k - \Pi_{\mathcal{M} \backslash \mathcal{B}_k}(c_k)\|_2^2. \quad \text{(Equation 14)}$$

$\chi(c_i)$ can be used, which verifies whether $c_i$ is inside $\mathcal{M} \backslash \mathcal{B}_i$, the model obtained by removing a vertex, as well as all its adjacent edges, from $\mathcal{S}$.

Figure 11:
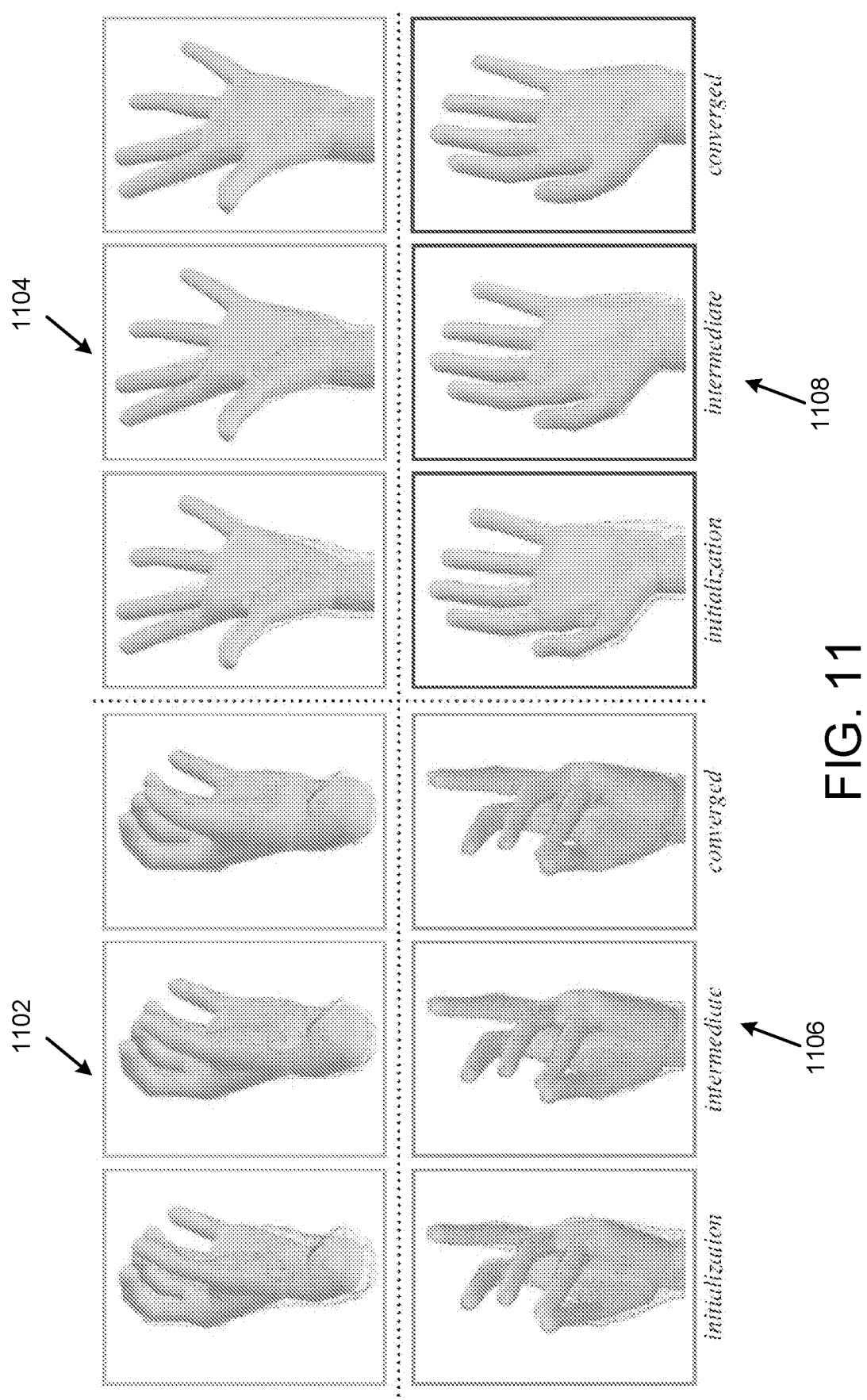
FIG. 11 is a diagram depicting four example data frames undergoing three iterations of calibration using calibration techniques described herein.

FIG. 11 is a diagram depicting four example data frames 1102-1106 undergoing three iterations of calibration using calibration techniques described herein. In FIG. 11, the same model is rigidly articulated to fit to a different pose in each of the data frames 1102-1106. The use of multiple frames in different poses can be useful for automatically adjusting the centers locations $\{C_n\}$ to create an articulated model that consensually fits the whole dataset.

The importance in some scenarios of adjusting kinematic chain transformations is shown in 1006 and 1008 of FIG. 10, as well as 302 and 304 in FIG. 3. With incorrect transformations, joint limits and the articulation restrictions of the kinematic chain can prevent the model from being posed correctly.

Figure 12:
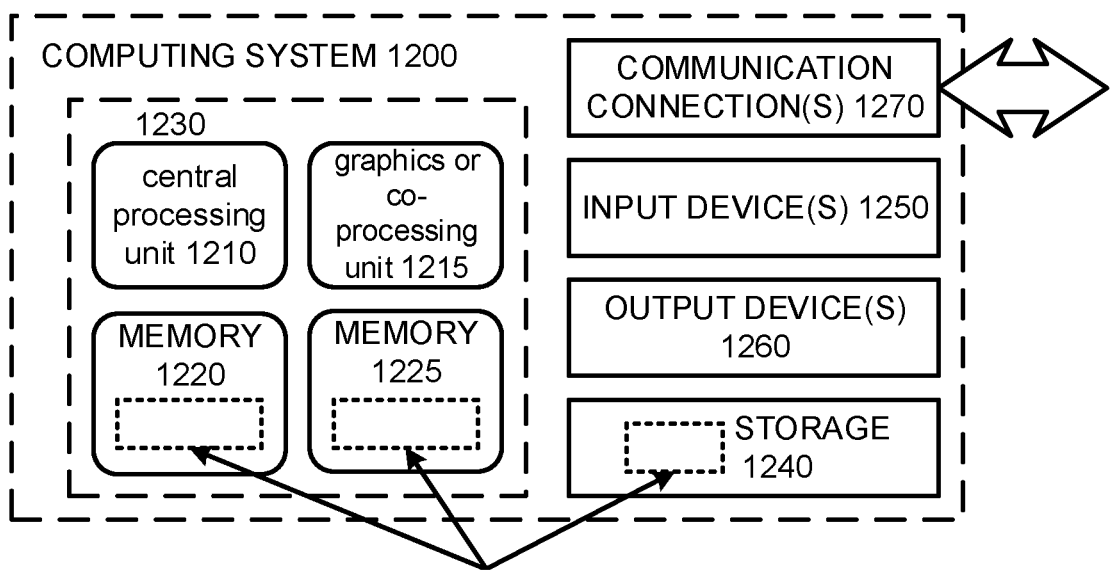
FIG. 12 is a diagram of an example computing system in which some described embodiments can be implemented.

FIG. 12 depicts a generalized example of a suitable computing system 1200 in which the described innovations may be implemented. The computing system 1200 is not intended to suggest any limitation as to scope of use or functionality, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s).

A computing system may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. For video encoding, the input device(s) 1250 may be a camera, video card, TV tuner card, or similar device that accepts video input in analog or digital form, or a CD-ROM or CD-RW that reads video samples into the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Figure 13:
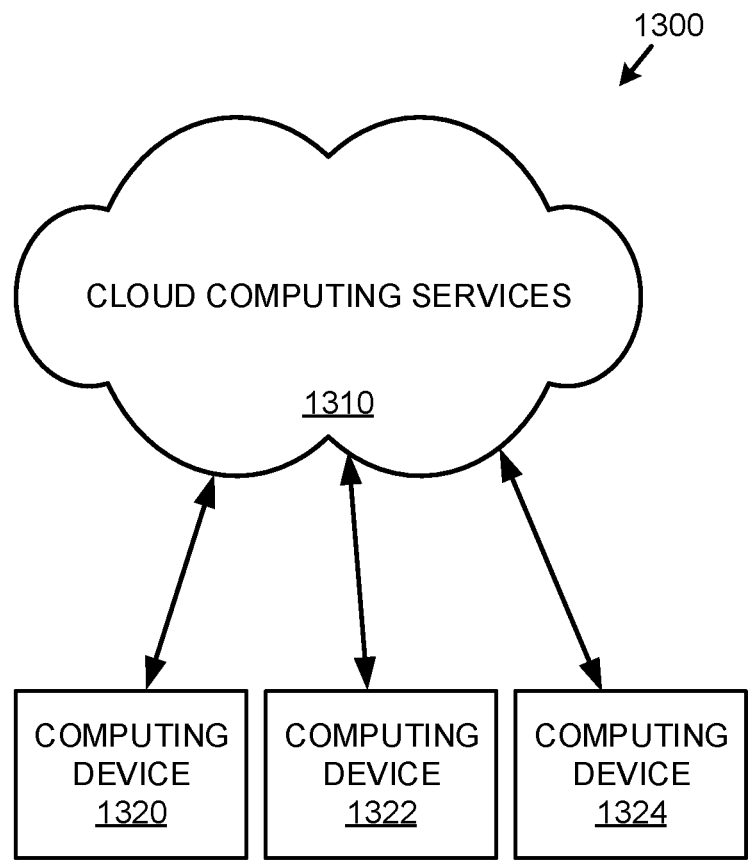
FIG. 13 is an example cloud computing environment that can be used in conjunction with the technologies described herein.

FIG. 13 depicts an example cloud computing environment 1300 in which the described technologies can be implemented. The cloud computing environment 1300 comprises cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries).

The cloud computing services 1310 are utilized by various types of computing devices (e.g., client computing devices), such as computing devices 1320, 1322, and 1324. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operators (e.g., data processing, data storage, and the like).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 12, computer-readable storage media include memory 1220 and 1225, and storage 1240. The term computer-readable storage media does not include signals and carrier waves. In addition, the term computer-readable storage media does not include communication connections (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, Python, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

We claim:

1. A method for modeling and tracking a physical object, the method comprising:
generating a sphere-mesh model of the physical object, wherein the sphere-mesh model comprises an explicit skeletal mesh comprising multiple connected vertices and an implicit surface generated based on the skeletal mesh, wherein generating the implicit surface based on the skeletal mesh comprises creating sphere-mesh primitives comprising spheres with radii that are properties of the multiple vertices of the explicit skeletal mesh, and centering the spheres on the multiple vertices;
receiving a data frame from a sensor camera associated with a camera direction, wherein the data frame comprises depth information for points within a field of view of the sensor camera from the camera direction, wherein the physical object is within the field of view of the sensor camera; and
determining a distance between one of the points within the field of view of the sensor camera and the implicit surface of the sphere-mesh model by determining a distance between the one of the points and the explicit skeletal mesh of the sphere-mesh model, wherein the determining the distance includes finding a closest point on the sphere-mesh model and replacing a back facing closest point with a front facing closest point.

2. The method of claim 1, wherein the determining the distance between the one of the points within the field of view and the implicit surface comprises determining a distance between the one of the points and the sphere-mesh primitives.

3. The method of claim 1, wherein the determining the distance between the one of the points and the sphere-mesh primitives comprises using the vertices and the associated radii of the sphere-mesh primitives to determine a point of the implicit surface closest to the one of the points.

4. The method of claim 1, wherein the generating the implicit surface further comprises creating a pill primitive as a convex hull of two of the sphere-mesh primitives for two of the connected vertices.

5. The method of claim 1, wherein the generating the implicit surface further comprises creating a wedge primitive as a convex hull of three of the sphere-mesh primitives for three of the connected vertices.

6. The method of claim 1, further comprising:
generating a sphere-mesh model template, wherein the generating the sphere-mesh model template comprises adjusting a topological structure of the sphere-mesh model to match a topological structure of the physical object, wherein the adjusting comprises adjusting a position of at least one of the multiple vertices and/or adjusting at least one of the radii associated with the multiple vertices.

7. The method of claim 1, further comprising calibrating the sphere-mesh model, wherein the calibrating comprises:
adjusting positions of the multiple vertices and adjusting the associated radii to match the implicit surface to a geometric representation of the physical object.

8. The method of claim 7, further comprising:
obtaining the geometric representation of the physical object from the sensor camera.

9. The method of claim 1, wherein the physical object comprises a human body part.

10. The method of claim 1, wherein the physical object comprises a human hand.

11. The method of claim 10, further comprising determining at least one convolution surface corresponding to the human hand and adjusting at least one radius and one vertex of the sphere-mesh model to alter the at least one convolution surface.

12. A system, comprising:
a depth sensor configured to generate depth points within a field of view of the depth sensor; and
a computing device connected to the depth sensor and configured to:
generate a sphere-mesh model of a physical object, wherein the sphere-mesh model comprises an explicit skeletal mesh comprising multiple connected vertices and an implicit surface generated based on the skeletal mesh, wherein generating the implicit surface based on the skeletal mesh comprises creating sphere-mesh primitives comprising spheres with radii that are properties of the multiple vertices of the explicit skeletal mesh, and centering the spheres on the multiple vertices;
receive the depth points from the depth sensor; and
determine a distance between one of the depth points and the implicit surface of the sphere-mesh model by determining a distance between the one of the depth points and the explicit skeletal mesh of the sphere-mesh model, wherein the determining the distance includes finding a closest point on the sphere-mesh model and replacing a back facing closest point with a front facing closest point.

13. The system of claim 12, wherein the determining the distance between the one of the depth points and the implicit surface comprises determining a distance between the one of the depth points and the sphere-mesh primitives.

14. The system of claim 12, wherein the determining the distance between the one of the depth points and the sphere-mesh primitives comprises using the vertices and the associated radii of the sphere-mesh primitives to determine a point of the implicit surface closest to the one of the depth points.

15. The system of claim 12, wherein the generating the implicit surface further comprises creating a pill primitive as a convex hull of two of the sphere-mesh primitives for two of the connected vertices.

16. The system of claim 12, wherein the generating the implicit surface further comprises creating a wedge primitive as a convex hull of three of the sphere-mesh primitives for three of the connected vertices.

17. The system of claim 12, wherein the computing device is further configured to:
generate a sphere-mesh model template, wherein the generating the sphere-mesh model template comprises adjusting a topological structure of the sphere-mesh model to match a topological structure of the physical object, wherein the adjusting comprises adjusting a position of at least one of the multiple vertices and/or adjusting at least one of the radii associated with the multiple vertices.

18. The system of claim 12, wherein the computing device is further configured to calibrate the sphere-mesh model, wherein the calibrating comprises:
adjusting positions of the multiple vertices and adjusting the associated radii to match the implicit surface to a geometric representation of the physical object.

19. The system of claim 18, wherein the computing device is further configured to obtain the geometric representation of the physical object from the depth sensor.

20. The system of claim 12, wherein the physical object comprises a human body part.

21. The system of claim 12, wherein the physical object comprises a human hand.

22. The system of claim 12, wherein the closest point on the sphere-mesh model is determined to be front-facing based on a surface normal to a convolution surface associated with the sphere-mesh model.

23. One or more computer-readable media storing instructions that, when executed by one or more processors, cause the one or more processors to perform operations, the operations comprising:
generating a sphere-mesh model of a physical object, wherein the sphere-mesh model comprises an explicit skeletal mesh comprising multiple connected vertices and an implicit surface generated based on the skeletal mesh, wherein generating the implicit surface based on the skeletal mesh comprises creating sphere-mesh primitives comprising spheres with radii that are properties of the multiple vertices of the explicit skeletal mesh, and centering the spheres on the multiple vertices;
receiving a data frame from a sensor camera, wherein the data frame comprises depth information for points within a field of view of the sensor camera; and
determining a distance between one of the points within the field of view and the implicit surface of the sphere-mesh model by determining a distance between the one of the points and the explicit skeletal mesh of the sphere-mesh model, wherein the determining the distance includes finding a closest point on the sphere-mesh model and replacing a back facing closest point with a front facing closest point.

24. The one or more computer-readable media of claim 23, wherein the determining the distance between the one of the points within the field of view and the implicit surface comprises determining a distance between the one of the points and the sphere-mesh primitives.

25. The one or more computer-readable media of claim 23, wherein the determining the distance between the one of the points and the sphere-mesh primitives comprises using the vertices and the associated radii of the sphere-mesh primitives to determine a point of the implicit surface closest to the one of the points.

26. The one or more computer-readable media of claim 23, wherein the generating the implicit surface further comprises creating a pill primitive as a convex hull of two of the sphere-mesh primitives for two of the connected vertices.

27. The one or more computer-readable media of claim 23, wherein the generating the implicit surface further comprises creating a wedge primitive as a convex hull of three of the sphere-mesh primitives for three of the connected vertices.

28. The one or more computer-readable media of claim 23, wherein the operations further comprise:
generating a sphere-mesh model template, wherein the generating the sphere-mesh model template comprises adjusting a topological structure of the sphere-mesh model to match a topological structure of the physical object, wherein the adjusting comprises adjusting a position of at least one of the multiple vertices and/or adjusting at least one of the radii associated with the multiple vertices.

29. The one or more computer-readable media of claim 23, wherein the operations further comprise calibrating the sphere-mesh model, wherein the calibrating comprises:
adjusting positions of the multiple vertices and adjusting the associated radii to match the implicit surface to a geometric representation of the physical object.

30. The one or more computer-readable media of claim 23 claim 29, wherein the operations further comprise:

obtaining the geometric representation of the physical object from the sensor camera.

31. The one or more computer-readable media of claim 23, wherein the physical object comprises a human body part.

32. The one or more computer-readable media of claim 23, wherein the physical object comprises a human hand.

* * * * *